(12) United States Patent
Levine et al.

(10) Patent No.: US 7,467,106 B1
(45) Date of Patent: Dec. 16, 2008

(54) SYSTEM AND METHOD FOR OFFER MANAGEMENT

(75) Inventors: Adam Michael Levine, Wilmington, DE (US); Shane P. Pederson, Oak Park, IL (US); Tak Wing (Edward) Lau, Needham, MA (US)

(73) Assignee: JPMorgan Chase Bank, N.A., New York, NY (US)

( * ) Notice: Subject to any disclaimer, the term of this patent is extended or adjusted under 35 U.S.C. 154(b) by 933 days.

(21) Appl. No.: 10/869,905

(22) Filed: Jun. 18, 2004

(51) Int. Cl.
*G06Q 40/00* (2006.01)

(52) U.S. Cl. .............................. 705/35; 705/10; 705/14

(58) Field of Classification Search .............. 705/10–44
See application file for complete search history.

(56) References Cited

U.S. PATENT DOCUMENTS

| | | |
|---|---|---|
| 3,634,669 A | 1/1972 | Soumas et al. |
| 3,946,206 A | 3/1976 | Darjany |
| 4,047,033 A | 9/1977 | Malmberg |
| 4,545,838 A | 10/1985 | Minkus |
| 4,582,985 A | 4/1986 | Lofberg |
| 4,594,663 A | 6/1986 | Nagata et al. |
| 4,634,845 A | 1/1987 | Hale et al. |
| 4,642,768 A | 2/1987 | Roberts |
| 4,700,055 A | 10/1987 | Kashkashian |
| 4,750,119 A | 6/1988 | Cohen |
| 4,766,293 A | 8/1988 | Boston |
| 4,831,242 A | 5/1989 | Englehardt |
| 4,882,675 A | 11/1989 | Nichtberger |
| 4,897,533 A | 1/1990 | Lyszczarz |
| 4,906,826 A | 3/1990 | Spencer |
| 4,953,085 A | 8/1990 | Atkins |
| 4,978,401 A | 12/1990 | Bonomi |
| 5,025,372 A | 6/1991 | Burton |
| 5,080,748 A | 1/1992 | Bonomi |

(Continued)

FOREIGN PATENT DOCUMENTS

CA    2293321    12/1998

OTHER PUBLICATIONS

Welcome to Card Express, The CardEx Incentive Card, as disclosed in the CardEx web site archived by web.archive.org on Feb. 7, 1998 [http://web.archive.org/web/*/http://www.cardex.com], retrieve Oct. 18, 2003, 8 pages.

(Continued)

*Primary Examiner*—Frantzy Poinvil
(74) *Attorney, Agent, or Firm*—Goodwin Procter LLP

(57) ABSTRACT

A method for offer management may comprise: providing a plurality of offers for targeting at a plurality of accounts based on a plurality of business rules; prioritizing the plurality of offers; grouping the accounts based on their qualification for each offer in accordance with the business rules; optimizing the business rules based on the prioritization of the offers and the grouping of the accounts, such that each offer is associated with at least a predetermined number of accounts; imposing a volume limit or weight limit for offers assigned to each account; incorporating the offers into communications associated with the plurality of accounts based on the optimized business rules and the volume limit or weight limit; and managing production of the communications based on at least one simulation, wherein the at least one simulation is performed based on data associated with the offers, business rules and the accounts.

30 Claims, 7 Drawing Sheets

U.S. PATENT DOCUMENTS

| | | |
|---|---|---|
| 5,095,194 A | 3/1992 | Barbanell |
| 5,117,355 A | 5/1992 | McCarthy |
| 5,175,416 A | 12/1992 | Mansvelt |
| 5,180,901 A | 1/1993 | Hiramatsu |
| 5,192,947 A | 3/1993 | Neustein |
| 5,202,826 A | 4/1993 | McCarthy |
| 5,218,631 A | 6/1993 | Katz |
| 5,276,311 A | 1/1994 | Hennige |
| 5,287,268 A | 2/1994 | McCarthy |
| 5,287,269 A | 2/1994 | Dorrough |
| 5,297,026 A | 3/1994 | Hoffman |
| 5,311,594 A | 5/1994 | Penzias |
| 5,326,960 A | 7/1994 | Tannenbaum |
| 5,339,239 A | 9/1994 | Toshiyuki |
| 5,349,633 A | 9/1994 | Katz |
| 5,350,906 A | 9/1994 | Brody et al. |
| 5,365,575 A | 11/1994 | Katz |
| 5,397,881 A | 3/1995 | Mannik |
| 5,424,524 A | 6/1995 | Ruppert |
| 5,450,477 A | 9/1995 | Amarant |
| 5,459,306 A | 10/1995 | Stein |
| 5,465,206 A | 11/1995 | Hilt |
| 5,466,919 A | 11/1995 | Hovakimian |
| 5,471,669 A | 11/1995 | Lidman |
| 5,477,038 A | 12/1995 | Levine |
| 5,479,494 A | 12/1995 | Clitherow |
| 5,482,139 A | 1/1996 | Rivalto |
| 5,483,444 A | 1/1996 | Heintzeman |
| 5,500,514 A | 3/1996 | Veeneman |
| 5,511,114 A | 4/1996 | Stimson |
| 5,521,363 A | 5/1996 | Tannenbaum |
| 5,530,232 A | 6/1996 | Taylor |
| 5,530,235 A | 6/1996 | Stekfik |
| 5,537,314 A | 7/1996 | Kanter |
| 5,544,086 A | 8/1996 | Davis |
| 5,544,246 A | 8/1996 | Mandelbaum |
| 5,553,120 A | 9/1996 | Katz |
| 5,577,109 A | 11/1996 | Stimson |
| 5,578,808 A | 11/1996 | Taylor |
| 5,585,787 A | 12/1996 | Wallerstein |
| 5,590,038 A | 12/1996 | Pitroda |
| 5,608,785 A | 3/1997 | Kasday |
| 5,621,787 A | 4/1997 | McKoy |
| 5,637,845 A | 6/1997 | Kolls |
| 5,644,727 A | 7/1997 | Atkins |
| 5,649,118 A | 7/1997 | Carlisle |
| 5,664,110 A | 9/1997 | Green |
| 5,675,607 A | 10/1997 | Alesio |
| 5,677,955 A | 10/1997 | Doggett |
| 5,689,100 A | 11/1997 | Carrithers |
| 5,689,650 A | 11/1997 | McClelland |
| 5,703,344 A | 12/1997 | Bezy |
| 5,708,422 A | 1/1998 | Blonder |
| 5,710,886 A | 1/1998 | Christensen |
| 5,715,399 A | 2/1998 | Bezos |
| 5,721,768 A | 2/1998 | Stimson |
| 5,727,153 A | 3/1998 | Powell |
| 5,729,693 A | 3/1998 | Holda-Fleck |
| 5,737,421 A | 4/1998 | Audebert |
| 5,745,706 A | 4/1998 | Wolfberg et al. |
| 5,760,381 A | 6/1998 | Stich |
| 5,765,141 A | 6/1998 | Spector |
| 5,770,843 A | 6/1998 | Rose |
| 5,774,870 A | 6/1998 | Storey |
| 5,777,305 A | 7/1998 | Smith |
| 5,777,306 A | 7/1998 | Masuda |
| 5,787,156 A | 7/1998 | Katz |
| 5,787,404 A | 7/1998 | Fernndez-Holmann |
| 5,802,176 A | 9/1998 | Audebert |
| 5,806,042 A | 9/1998 | Kelly |
| 5,835,576 A | 11/1998 | Katz |
| 5,845,259 A | 12/1998 | West |
| 5,852,811 A | 12/1998 | Atkins |
| 5,857,079 A | 1/1999 | Claus |
| 5,857,709 A | 1/1999 | Chock |
| 5,859,419 A | 1/1999 | Wynn |
| 5,864,609 A | 1/1999 | Cross |
| 5,864,828 A | 1/1999 | Atkins |
| 5,864,830 A | 1/1999 | Armetta |
| 5,870,718 A | 2/1999 | Spector |
| 5,870,721 A | 2/1999 | Norris |
| 5,875,437 A | 2/1999 | Atkins |
| 5,883,810 A | 3/1999 | Franklin |
| 5,884,285 A | 3/1999 | Atkins |
| 5,887,065 A | 3/1999 | Audebert |
| 5,911,135 A | 6/1999 | Atkins |
| 5,911,136 A | 6/1999 | Atkins |
| 5,926,800 A | 7/1999 | Baronowski |
| 5,930,217 A | 7/1999 | Kayanuma |
| 5,937,068 A | 8/1999 | Audebert |
| 5,940,811 A | 8/1999 | Norris |
| 5,955,961 A | 9/1999 | Wallerstein |
| 5,970,480 A | 10/1999 | Kalina |
| 5,974,399 A | 10/1999 | Giuliani et al. |
| 5,991,750 A | 11/1999 | Watson |
| 6,000,608 A | 12/1999 | Dorf |
| 6,000,832 A | 12/1999 | Franklin et al. |
| 6,009,415 A | 12/1999 | Shurling et al. |
| 6,014,645 A | 1/2000 | Cunningham |
| 6,016,954 A | 1/2000 | Abe et al. |
| 6,032,136 A | 2/2000 | Brake, Jr. et al. |
| 6,036,099 A | 3/2000 | Leighton |
| 6,038,552 A | 3/2000 | Fleischl et al. |
| 6,070,153 A | 5/2000 | Simpson |
| 6,105,865 A | 8/2000 | Hardesty |
| 6,128,598 A | 10/2000 | Walker et al. |
| 6,128,599 A | 10/2000 | Walker et al. |
| 6,164,533 A | 12/2000 | Barton |
| 6,167,385 A | 12/2000 | Hartley-Urquhart |
| 6,189,787 B1 | 2/2001 | Dorf |
| 6,227,447 B1 | 5/2001 | Campisano |
| 6,243,688 B1 | 6/2001 | Kalina |
| 6,308,268 B1 | 10/2001 | Audebert |
| 6,341,724 B2 | 1/2002 | Campisano |
| 6,345,261 B1 | 2/2002 | Feidelson et al. |
| 6,349,242 B2 * | 2/2002 | Mahaffey .................. 700/220 |
| 6,373,969 B1 | 4/2002 | Adler |
| 6,429,927 B1 | 8/2002 | Borza |
| 6,434,259 B1 | 8/2002 | Hamid |
| 6,446,210 B1 | 9/2002 | Borza |
| 6,498,861 B1 | 12/2002 | Hamid |
| 6,615,189 B1 | 9/2003 | Phillips et al. |
| 6,641,050 B2 | 11/2003 | Kelley |
| 7,058,508 B2 * | 6/2006 | Combs et al. ............... 701/213 |
| 2002/0095365 A1 | 7/2002 | Slavin |

OTHER PUBLICATIONS

Welcome to Card Express, CardEx web site archived by web.archive.org on Oct. 31, 1996 [http://web.archive.org/web/*/http://www.cardex.com], retrieve Oct. 18, 2003, 7 pages.

CardEx Incentives, Apr. 6, 1999, www.cardexco.com, 15 pages.

"Associates First Capital Corporation", Hoover's Inc., The Industry Standard: The Newsmagazine of the Internet Economy, thestandard.net/companies/cpmpany-display, Apr. 6, 1999, 2 pages.

Jeffrey M. Lacker, "Stored Value Cards: Costly Private Substitutions for Government Currency", Economic Quarterly, 1996, 9 pages.

"The Evolution of a New Consumerism", Chain Store Age, vol. 73, pp. 8-9, Jun. 1997, 4 pages.

Lisa Fickenscher, "Amex prepaid offering is latest card for firms regarding employees", American Banker, vol. 161, No. 151, Aug. 8, 1996, 2 pages.

"Welcome to Swiftgift", Swiftgift, www.swiftgiftcard.com, Dec. 8, 1998, 10 pages.

Lucy Lzarony, "Stuck for a gift? Give a prepaid credit card", www.bankrate.com, Dec. 21, 1998, 2 pages.
Antoinette Coulton, "Incentives field moving to card-based series 14", American Banker, Mar. 26, 1998, 3 pages.
Credit Card News, "A store card issuer looks for lift from electronic gift certificates", Feb. 1, 1995, 2 pages.
Business Travel News, "Maritz gets mastercard's stamp of approval", Aug. 19, 1996, 2 pages.
Debit Card News, vol. 2, Issue 2, "Boatman's floats stored value into the employee incentive waters", Jul. 16, 1996, 3 pages.
Mickey Meece, "Boatman's prepaid cards for worker-incentive firm", American Banker, Jul. 2, 1996, 1 page.
Card News, vol. 6, No. 25, "D.C. Area Safeway stores look for increase in sales volume and revenue with cards", Dec. 1991, 3 pages.
Spurgin, "Sopininmon! or What's happening in the retail credit card environment", Credit World Journal, Apr. 1997, 7 pages.
AT&T Marketing, "Universal card free lifetime membership extended 3 months", www.att.com/press/0297/970217.csa.html, Dec. 4, 1990, 2 pages.
Chain Store Age Executive with Shopping Center Age, "More retailers turn to co-branding", Feb. 1, 1995, 3 pages.
Introducing SpendingMoney(TM), Armetta: Marketing & Design Product Concept Report, Oct. 9, 1996, 15 pages.
First USA Platinum Connect, First USA Bank, First USA Promotional Mailing, Oct. 1997, 6 pages.
Introducing the First USA Platinum Connect Card, First USA Promotional Mailing, Dec. 1997, 6 pages.
Here's the calling convenience you asked for: 1-800-call-AT&T . . . For All Calls, Appendix A: For Card Carriers, 7 pages.
Beth Piskora, Debit Cards Seen Poised for New Markets, American Banker, pp. 16, Mar. 7, 1995, 1 page.
Nick Rosen, Cash Just Isn't Flexible Enough: Shops of the Future Will Only Take Cards, Daily Express: Technology Section, Feb. 10, 1995, 1 page.
Phil Britt, Competing in Auto Lending, America's Community Banker; vol. 5, No. 11, pp. 33-37, Nov. 1, 1996, 7 pages.
Miriam Krenin Souccar, Smart Cards: 1st Union Smart Card Pilot Enlists a Second Army Base, American Banker, 3 pages.
First Union Issues Smart Cards to Fort Benning Recruits, CardFax, 1 page.
Emerson Brown and Jim Baum, Purchasing Card Magic: Eli Lilly Finds Accounts Payable Flying High With Plastic, Corporate Cashflow, 4 pages.
Christine Dugas, Payroll May Ask: Paper or Plastic?, USA Today, 3B, Aug. 14, 2001, 1 page.
Cards International Jan. 30, 1996, First Data markets stored-value cards, 2 pages.
Business Wire, Jan. 15, 1996, CES/NaBANCO introduces stored value card technology; blockbuster video is first merchant partner, 2 pages.
Melinda Norris, et al., Omaha World Herald, Jan. 19, 1996, Sunrise Edition, First data unit develops blockbuster cash card, 2 pages.
Valerie Block, The American Banker, Sep. 1, 1995, Blockbuster running test of a stored value card, 2 pages.
Sora Song, A card that asks for ID, Monday, Apr. 12, 2004, Time Magazine, 1 page.
Rachel Konrad, Associated Press, IBM had a bunch of unusual ideas in 2003, printed from Philly.com on Jan. 21, 2004, posted on Tues., Jan. 13, 2004, 2 pages.
Incentive firms debit cards a rewarding experience (Off-line debit card issuers converge efforts with companies looking for effective incentives to boost employee productivity and to motivate individuals to buy their products), Debit Card News, vol. 3, No. 11, Nov. 28, 1997, (Author unknown), 3 pages.
News Release, For Release: Monday, Feb. 17, 1997, New 1-800-CALL-ATT campaign promotes one number for all calls, 2 pages.
S. P. Miller et al., Section E.2.1: Kerberos Authentication and Authorization System, Project Athena, Cambridge, Massachusetts, Dec. 21, 1987, 39 pages.
Swift Gift 'Wows' Internet Shoppers, Wed., Dec. 2, 1998, PR Newswire, 2 pages (Author Unknown).

* cited by examiner

SYSTEM AND METHOD FOR OFFER MANAGEMENT

CROSS-REFERENCE TO RELATED APPLICATIONS

This patent application is related to a co-pending U.S. patent application Ser. No. 10/869,904, entitled "System and Method for Offer Targeting", naming as first-inventor "Adam M. Levine," filed Jun. 18, 2004, which is hereby incorporated by reference herein in its entirety.

FIELD OF THE INVENTION

The present invention relates generally to business communication and marketing. More particularly the present invention relates to a system and method for offer management.

BACKGROUND OF THE INVENTION

A financial company typically mails statements to its credit card members or banking customers on a monthly basis. The financial company may also frequently mail credit cards or banking cards to the customers for re-issues or replacements. In addition, the company may occasionally send letters to current or potential customers for various purposes. Millions of mail pieces are produced and delivered every month for these purposes. Though a costly process, mailing of the statements, cards and letters creates a valuable opportunity for the company and its partners to promote products and services to the customers. These mail pieces are usually guaranteed to reach a large number of families or individuals and are much more likely to receive attention than other types of mass mailings. Companies have long been taking advantage of this communication channel by including advertisements and solicitations in the outgoing statements or letters. These advertisements or solicitations or the like (hereinafter collectively referred to as "offers") may take the form of a message, an insert, a billhead, a convenience check, an inner envelope or an outer envelope, for example. An offer typically describes a specific promotional program (e.g., one related to a financial or insurance product) that is offered by a business entity and is usually targeted at a specific group of customers.

It is a demanding task to manage offers and to incorporate them into outgoing mail pieces. For any given month, a large financial company may typically target hundreds of offers at millions of customers based on complex business rules. These offers need to be properly created together with associated rules, matched to appropriate accounts, produced on a variety of paper stocks, and inserted into outgoing mail pieces. This same or similar process is typically repeated several times ("cycles") each month. The large volumes of mail pieces require considerable investment of resources, the successful return of which depends heavily on the accuracy, efficiency and consistency in the offer management process.

A number of problems and drawbacks exist in traditional solutions of offer management. In general, there has not been a streamlined end-to-end process for offer management. Existing solutions typically fail to integrate the various offer management steps, such as offer and rule creation, offer prioritization, rule optimization, weight management, insert production and inventory management, into a coherent cycle. As a result, there is usually a lack of coordination among the offer management steps as well as between the mailing cycles. For example, it is not uncommon for prior art systems to encounter overages (i.e., excessive inventory for a particular offer) or unexpected stock-outs (i.e., unavailable inventory for a particular offer), both of which could be costly.

Other problems and drawbacks also exist.

In view of the foregoing, it would be desirable to provide a solution for offer management which overcomes the above-described deficiencies and shortcomings.

SUMMARY OF THE INVENTION

One embodiment of the present invention comprises a method for offer management. The method comprises: providing a plurality of offers and a plurality of business rules, wherein each of the plurality of offers is to be targeted at a predetermined number of accounts selected from a plurality of accounts based on the plurality of business rules; prioritizing the plurality of offers; grouping the plurality of accounts based on their qualification for each of the plurality of offers in accordance with the plurality of business rules; optimizing the plurality of business rules based at least in part on the prioritization of the plurality of offers and the grouping of the plurality of accounts, such that each of the plurality of offers is associated with at least the predetermined number of accounts; imposing a volume limit or weight limit for offers assigned to each of the plurality of accounts; incorporating the plurality of offers into communications associated with the plurality of accounts based at least in part on the plurality of optimized business rules and the volume limit or weight limit; and managing production of the communications based on at least one simulation, wherein the at least one simulation is performed based on data associated with the plurality of offers, the plurality of business rules and the plurality of accounts.

Another embodiment of the present invention comprises a system for offer management. The system comprises: at least one user interface for entering and modifying a plurality of offers and a plurality of business rules, wherein each of the plurality of offers is to be targeted at a predetermined number of accounts selected from a plurality of accounts based on the plurality of business rules; storage means for storing and managing the plurality of offers, the plurality of business rules and the plurality of accounts; and processor means for: prioritizing the plurality of offers, grouping the plurality of accounts based on their qualification for each of the plurality of offers in accordance with the plurality of business rules, optimizing the plurality of business rules based at least in part on the prioritization of the plurality of offers and the grouping of the plurality of accounts, such that each of the plurality of offers is associated with at least the predetermined number of accounts, imposing a volume limit or weight limit for offers assigned to each of the plurality of accounts, incorporating the plurality of offers into communications associated with the plurality of accounts based at least in part on the plurality of optimized business rules and the volume limit or weight limit, and managing production of the communications based on at least one simulation, wherein the at least one simulation is performed based on data associated with the plurality of offers, the plurality of business rules and the plurality of accounts.

Yet another embodiment of the present invention comprises a method for offer management. The method comprises: providing a plurality of offers for incorporation into statement letters associated with a plurality of accounts, wherein the incorporation of the plurality of offers is based on a plurality of business rules; and simulating a final composition of the statement letters based at least in part on a prioritization of the plurality of offers, associations of the plurality of offers with the plurality of accounts, and layout, graphics and inventory weight associated with one or more sub-components of the statement letters.

Still another embodiment of the present invention comprises computer readable medium having code for causing at least one processor to perform offer management. The computer readable medium comprises: code adapted to provide a plurality of offers and a plurality of business rules, wherein each of the plurality of offers is to be targeted at a predetermined number of accounts selected from a plurality of accounts based on the plurality of business rules; code adapted to prioritize the plurality of offers; code adapted to group the plurality of accounts based on their qualification for each of the plurality of offers in accordance with the plurality of business rules; code adapted to optimize the plurality of business rules based at least in part on the prioritization of the plurality of offers and the grouping of the plurality of accounts, such that each of the plurality of offers is associated with at least the predetermined number of accounts; code adapted to impose a volume limit or weight limit for offers assigned to each of the plurality of accounts; code adapted to incorporate the plurality of offers into communications associated with the plurality of accounts based at least in part on the plurality of optimized business rules and the volume limit or weight limit; and code adapted to manage production of the communications based on at least one simulation, wherein the at least one simulation is performed based on data associated with the plurality of offers, the plurality of business rules and the plurality of accounts.

Additional features and advantages of the invention will be set forth in the description that follows, and in part will be apparent from the description and drawings, or may be learned by practice of the invention. The objects and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

DETAILED DESCRIPTION OF THE INVENTION

Reference will now be made in detail to the present embodiments of the invention, examples of which are illustrated in the accompanying drawings. For illustration purposes, embodiments of the invention are described in the context of a financial company managing offers to be targeted at its customers through the statement channel (e.g., monthly mailing of credit card statements or banking statements). It should be appreciated by those skilled in the art that the exemplary system and method as described herein is applicable or adaptable to other communication channels (e.g., E-mails, plastics, letters, telemarketing scripts and the like) through which individualized or customized information, such as messages, advertisements, proposals, solicitations and the like, may be selectively delivered.

Figure 1:
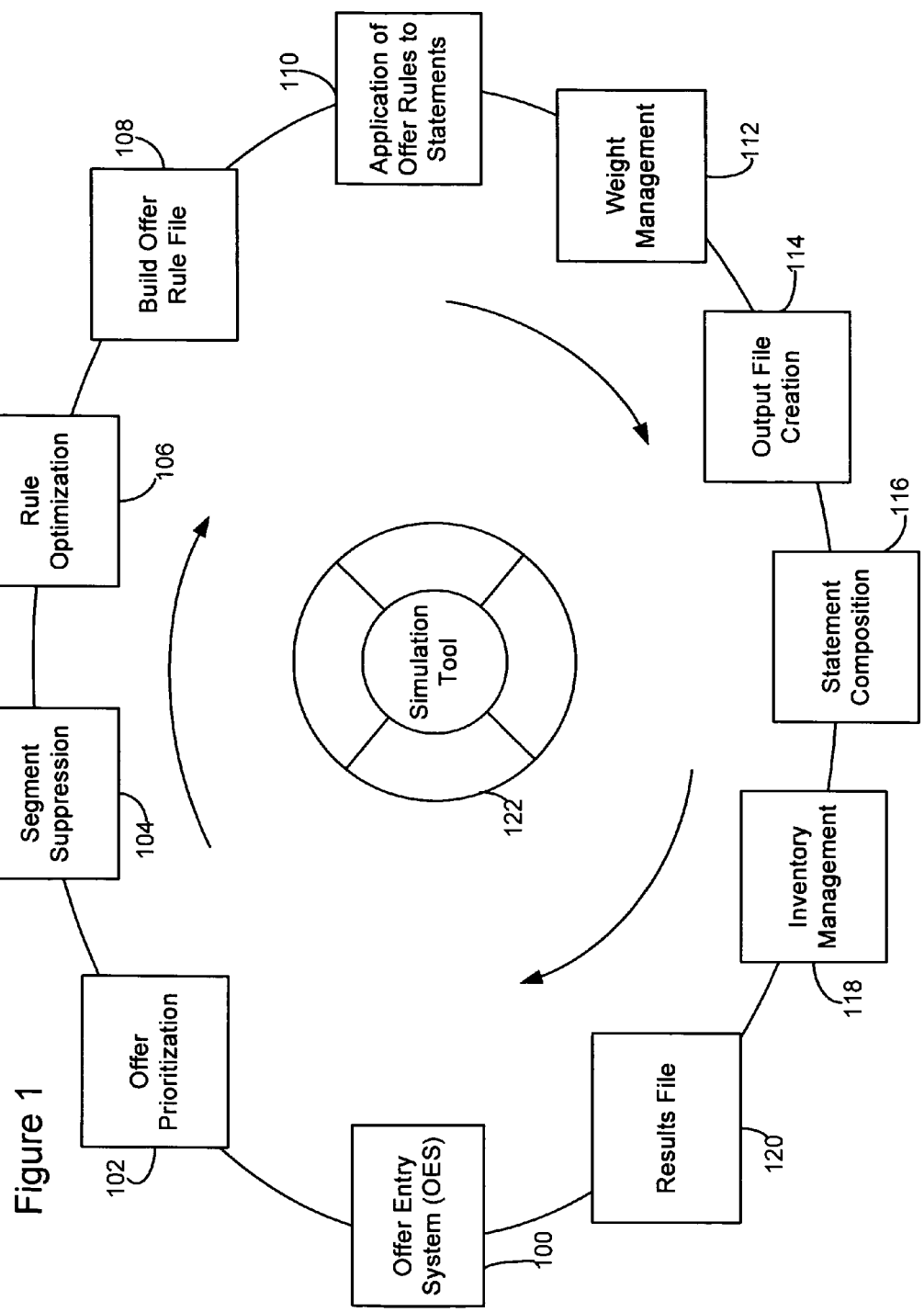
FIG. 1 is a flow chart illustrating an exemplary method for offer management according to an embodiment of the present invention.

Referring to FIG. 1, there is shown a flow chart illustrating an exemplary method for offer management according to an embodiment of the present invention. The process steps in this flow chart provide an overview of the inventive method. These process steps are typically cycled several times during a statement month.

In step 100, account managers may utilize an offer entry system (OES) to add, modify, delete or copy offer items and the related business rules. The account managers may be marketing and/or relationship personnel who are each in charge of one or more groups of customer accounts. The offer entry system may be a web-based application with a graphical user interface (GUI). The offer items may include information of financial products and services, insurance products, related programs, and compliance notifications, for example. The offer items may be associated with a number of business rules that govern the targeting of the offer items to customer populations. For example, the rules may specify qualification criteria for an account to receive specific offers, the number of accounts that each offer can target, variation of offer terms or pricing structures based on account characteristics, and the number of offers each account may receive. Both the offers and business rules may be newly created or modified based on past entries. The offers and rules may be on a partner level, a portfolio level, an individual account level or a combination thereof. For example, customer accounts that are associated with a particular business partner may be grouped accordingly. A portfolio typically includes one or more partner groups that share an association with a common business program. For illustration purposes, a plurality of accounts that belong to either a partner group or a portfolio will be hereinafter referred to collectively as a "group." A group may be identified with an account organization code (AOC) and an individual account may be identified with an account reference number (ARN). Offers may be targeted at an entire group without concerning characteristics of individual accounts within the group, for example. Or offers may be targeted at individual accounts regardless of which groups they belong to. The offer entry system may have data links to a number of data sources such as offer management files, list management files and a content management database. The offer entry system may also facilitate legal users to review and approve the offers for legal compliance. Super users or the statement team may access the offer entry system to process and audit offers.

In step 102, all offers for a statement month may be prioritized. A web-based application with a GUI may be utilized for offer prioritization. The prioritization application may provide the ability to execute the prioritization algorithm, adjust offer rankings and maintain prioritization rules. The priority rankings of the offers are typically based on a variety of factors, such as the offer category, partner or contractual obligations and profit potentials for each offer. For example, the offers may be categorized as mandatory or optional. The mandatory offers typically have higher priorities than optional ones. For another example, an offer with a historically better response rate (thus a greater profit potential) may have a higher priority than offers with lower response rates. In general, an offer may be assigned a priority ranking based on the extent that it comports with the overall strategic goals and objectives of the business organization. According to one embodiment of the invention, a business rules prioritization application may be run prior to the statement month to prioritize all the offers for that month. It is also possible to update the list of offers during the statement month and re-prioritize the offers accordingly.

According to an embodiment, historic account data may be used in measuring the effectiveness of statement offers. For example, it may be desirable to track the change of financial behaviors for an account before and after the insertion of a statement offer. One exemplary financial behavior worth monitoring is an account's outstanding balance B. In a scenario where only one offer is included in a statement, the fractional change in an account's outstanding balance during and after the insertion of the offer may be $$\beta_t(X) = \frac{B(t+1 \mid I_t = X)}{B(t)} - 1 \tag{1}$$

where t is the month during which the offer X is included in the statement and $I_t$ represent an offer set for month t. Similarly, the fractional change in the outstanding balance when no offer is included may be $$\beta_t(\phi) = \frac{B(t+1 \mid I_t = \phi)}{B(t)} - 1 \tag{2}$$

where $\phi$ represents an empty set of offers. When equations (1) and (2) are averaged over the set of accounts that have received offer X in month t, a fractional change in these accounts' outstanding balance due to offer X may be estimated. To compare the effectiveness of two offers $X_1$ and $X_2$, a statistical test of significance may be performed on the estimates of $\beta_t(X_1)$ and $\beta_t(X_2)$, where standard hypothesis testing methods may be applied. Alternatively, the effectiveness may be measured by a logarithm of the ratio between the outstanding amounts in the months during and after the statement is mailed:

$$\beta_t(X) = \log \frac{B(t+1 \mid I_t = X)}{B(t)} = \log B(t+1 \mid I_t = X) - \log B(t) \tag{3}$$

Depending on the range of values considered, sometimes it may be more desirable to calculate a logarithmic change than a fractional change. For illustrative purposes, however, only fractional changes will be described hereinafter.

Sometimes, the effect of an offer Q may last for a few months. In that case, the outstanding balance may be averaged for a time window subsequent to the insertion of offer Q, i.e., $$\beta_t(Q) = \frac{B(t+1 \mid I_t = Q, I_s \in \{Q, \phi\}) + B(t+2 \mid I_t = Q, I_s \in \{Q, \phi\}) + \ldots + B(t+K \mid I_t = Q, I_s \in \{Q, \phi\})}{K \times B(t)} - 1 \tag{4}$$

where K is the length of measurement window, $t<s\leq K$, and it is assumed that either the same offer Q or nothing is included in the rest of the measurement window. Equation (4) only uses the outstanding balance B(t) as a basis for comparison, which may be subject to high variability due to inherent randomness of the accounts' financial behavior. Thus, sometimes it may be desirable to use a larger base window of K' months. The fractional change is then $$\beta_t(X) = \frac{K'}{K} \times \frac{B(t+1 \mid I_t = Q, I_s \in \{Q, \phi\}) + B(t+2 \mid I_t = Q, I_s \in \{Q, \phi\}) + \ldots + B(t+K \mid I_t = Q, I_s \in \{Q, \phi\})}{B(t \mid I_t = X) + B(t-1 \mid I_{s'} \in \{Q, \phi\}) + \ldots + B(t-K'+1 \mid I_{s'} \in \{Q, \phi\})} - 1 \tag{5}$$

where $t-K'+1 \leq s' < t < s \leq K$.

In practice, each account often receives multiple offers. In order to determine the relative effectiveness of two offers, it may be beneficial to align those accounts whose offers differ only by the two in question. For example, to compare two offers $X_1$ and $X_2$, where either of them is accompanied by other offers $Y_1, Y_2, \ldots$, the fractional changes in outstanding balance may be $$\beta_t(X_1) = \frac{B(t+1 \mid I_t = X_1; Y_1, Y_2 \ldots)}{B(t)} - 1 \tag{6}$$

$$\beta_t(X_2) = \frac{B(t+1 \mid I_t = X_2; Y_1, Y_2 \ldots)}{B(t)} - 1 \tag{7}$$

Statistical test of significance can be performed on the estimates of $\beta_t(X_1)$ and $\beta_t(X_2)$ over those accounts that have received the offer sets $\{X_1, Y_1, Y_2 \ldots\}$ and $\{X_2, Y_1, Y_2 \ldots\}$ respectively.

According to embodiments of the present invention, it may be desirable to set up a test and control environment to measure incremental effects of a particular offer. For example, the two fractional changes, $\beta_t(X)$ and $\beta_t(\phi)$, may be calculated from two statistically identical populations before being compared. The population associated with $\beta_t(X)$ may be called a treatment group, and the population associated with $\beta_t(\phi)$ may be called a control group. Both groups may be selected such that a decision to include a particular offer equally applies to both of them, only that the offer is intentionally suppressed for the control group. When two offers $X_1$ and $X_2$ are to be compared, the control group may be selected to serve as a common platform for the testing of two different offers. Population sizes for all treatment groups and control groups are usually large enough so that statistical inferences may be drawn from the test results.

According to one embodiment of the present invention, a predictive model may be created for the statement offers. Assume that $X_i$ is an indicator variable that satisfies the following equation:

$$X_i = \begin{cases} 1, & \text{if the } i\text{-th offer is present in an account's} \\ & \text{statement in a certain month} \\ 0, & \text{if otherwise} \end{cases} \quad (8)$$

A predictive model may be a linear combination of all indictor variables:

$$Z = F(X_1, X_2, \ldots, X_N; \alpha_1, \alpha_2, \ldots, \alpha_N) \quad (9)$$

where N is a total number of offers, Z is a desired response variable, F( ) is the choice of modeling function, and $\{\alpha_1, \alpha_2, \ldots, \alpha_N\}$ is a finite set of modeling coefficients. In a simplest case, $$Z = \alpha_0 + \alpha_1 X_1 + \alpha_2 X_2 + \ldots + \alpha_N X_N + \epsilon \quad (10)$$

which makes F( ) a linear model with an additional coefficient $\alpha_0$ ($\epsilon$ represents modeling error). Then, standard regression techniques may be applied to determine these coefficients.

Figure 4:
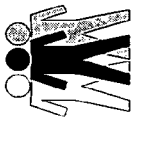
FIG. 4 is a block diagram illustrating an exemplary method for segment suppression according to an embodiment of the present invention.

Referring again to FIG. 1, in step 104, a segment suppression routine may be run. The suppression process may be carried out in real time when new offers and rules are entered. Based on relevant information received from a marketing department, a segment suppression system (SSS) may, for each offer, identify groups and/or accounts that are truly qualified to receive the offer. This initial account qualification process may group the qualified groups and/or accounts for each offer. As a result, those groups or accounts that do not qualify will be suppressed. One reason for implementing segment suppression is to accommodate the changing needs of the business divisions or partners who request the offers. From time to time, a business partner may choose to have its associated customer population receive ("opt-in") or not receive ("opt-out") certain offers. One simplified example is illustrated in FIG. 4 where six partners' "opt-in" and "opt-out" preferences with respect to Insurance Products, Home Equity Products, Checking Account Products and Other Products are mapped out in a table. As explained in the FIG. 4, it is the marketing personnel's responsibility to maintain records of each partner's preferences, i.e., marketing personnel look at the rows of the table. Relationship managers may determine what offers their partners are eligible to receive, and store the results in the segment suppression system. Part of the offer management process is to pull the list of partners (and subsequently, a list of eligible accounts) who are eligible to receive certain offer types from the SSS, and to incorporate the list into the overall decisioning process. That is, offer management looks at the columns of the table.

In step 106, a rule optimization algorithm may be run. One goal of the rule optimization algorithm is to assign the offers to selected qualified groups (or accounts) based on the offer rankings and the grouping generated in the preceding steps, such that each offer hits its requested volume of accounts. When an offer is entered for a marketing campaign, there is typically a request for the offer to be targeted at a predetermined number of accounts. Such request may be fulfilled in this rule optimization step. The offers may be assigned to their qualified groups (or accounts) in the order of offer rankings. At the same time, an offer counter may be maintained for each group (or account) to keep track of the number of offers already assigned to the particular group (or account). After assignment of each offer, all the groups (or accounts) may be sorted based on their offer counters so that a group (or account) with fewer offers assigned may have a higher priority in receiving offers in subsequent assignment processes. Lift percentages, which are factors derived in advance from analysis of past offer targeting performance, may be applied to each group to adjust its number of accounts that remain available for offer assignments. The combined effect of offer counter based re-prioritization and application of lift percentages is to ensure that no customer population is "over-targeted" (i.e., assigned more offers than requested) at the expense of other populations being "under-targeted" (i.e., receiving too few offers). Another measure to the similar effect is to discontinue an offer as soon as it has been targeted at enough accounts in a statement month as requested by Marketing. The rule optimization algorithm may effectively enhance the business rules entered through the offer entry system to generate specific associations between the offers and the customer populations on group level and/or account level. This algorithm is described in detail in a co-pending U.S. patent application Ser. No. 10/869,904, entitled "System and Method for Offer Targeting", naming as first-inventor "Adam M. Levine," filed Jun. 18, 2004, which is hereby incorporated by reference herein in its entirety.

In step 108, the enhanced or optimized business rules may be built into one or more offer rule files for delivery to the subsequent offer management process. A number of options exist for the electronic packaging and delivery of business rules. For example, the rules may be compiled into an extensible markup language (XML) file or an ILOG™ Business Action Language (BAL) file. The building of a BAL rule file may involve the steps of identifying all the decision elements (e.g., factors that affect the targeting of offers at customer populations) based on inputs to the offer entry system and rule optimization, creating Java objects whose attributes are mapped to the decision elements, designing and populating staging tables to hold all the offers and rule data, and building BAL rules using ILOG™ application program interfaces (API's). Further, a link may be created in the offer entry system web interface for building the BAL rules. The BAL rules may be stored in an ILOG™ JRuleS™ repository.

In step 110, the offer rules may be applied to the outgoing statements to associate the offers with qualified accounts. First, all relevant data (including offer data and statement data) may be extracted, validated and staged for processing. Then the data may be compiled for subsequent rule processing. Next the offer rules may be executed against the accounts and output files may be created for statement composition, such that the statement data of each account is properly associated with its corresponding offers.

Figure 5:
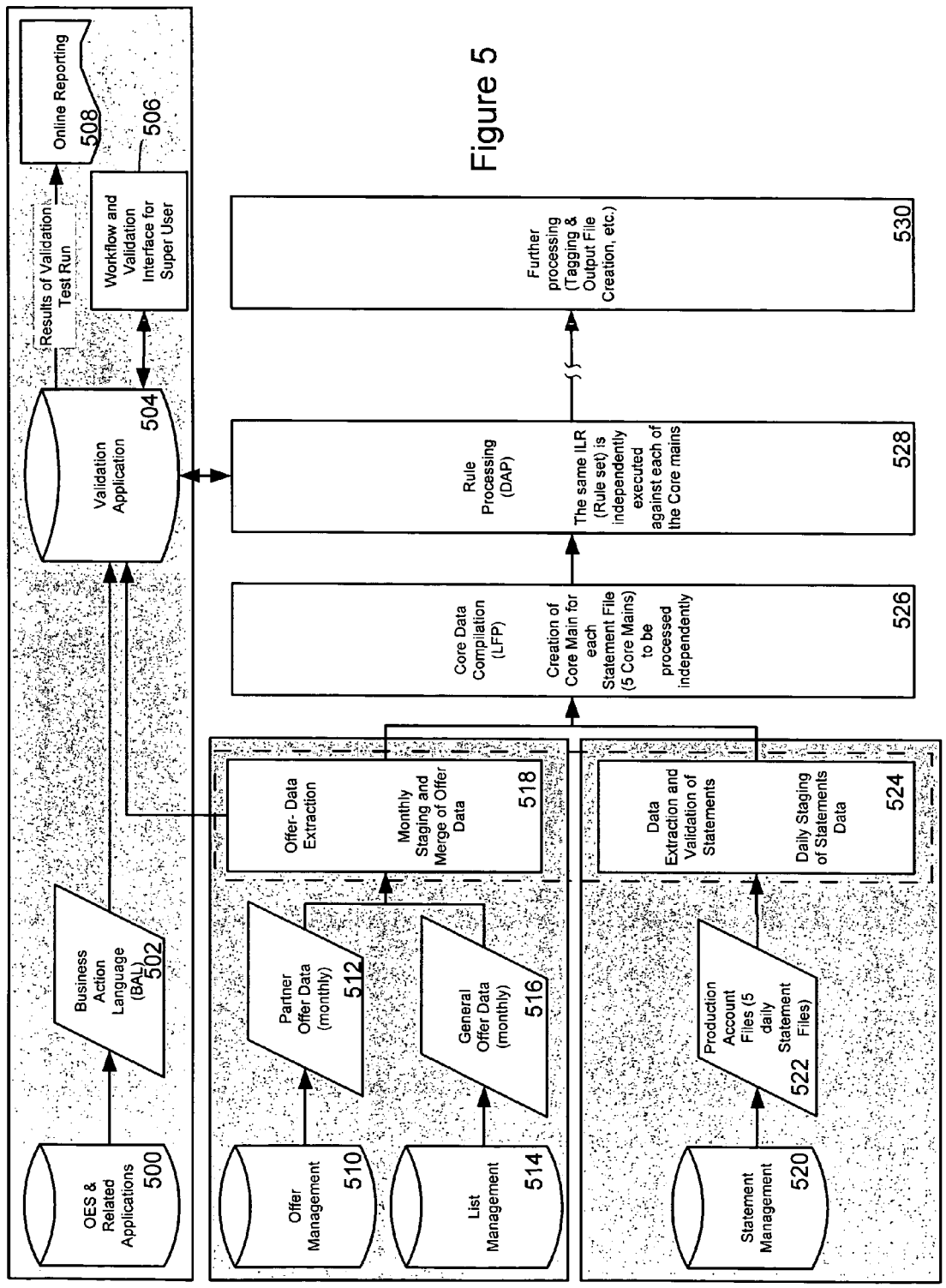
FIG. 5 is a block diagram illustrating an exemplary process for applying offers to statements according to an embodiment of the present invention.

An exemplary process for applying the rules is illustrated in FIG. 5. As shown, the relevant data may include at least the offer rules, offer data and statement data from their respective data sources. For example, offer rules may be imported from the OES and related applications (500) as described above. The offer rules may be passed in a BAL rule file (502). The offer data may be received from one or more offer management databases or applications. For example, offer management database 510 may provide offer data 512 related to one or more partners, and list management database 514 may provide data 516 related to general offers. The statement data may be imported from a statement management database or application (520). Since the offers are ancillary to the statement contents, the statement records are usually created prior to the insertion of offers. To start offer insertion as early as possible, it may be desirable to break the statement records into smaller files, for example five daily statement files (522) as shown in FIG. 5. As soon as one statement file has been processed by statement management database 520, it may be passed on for execution of offer rules. The partner offer data 512 and general offer data 516 may be extracted, validated and staged on a monthly basis in step 518 although updates may also be made during the statement month. If an offer set is refreshed anytime during the month, the new offer set data may be sent to a validation application 504. The validation application 504 may be controlled by a super user through an interface 506, and it may validate the offer rules against the offer data and statement data. Results of the validation test runs may be sent to an online reporting module 508. The statement data are typically extracted and staged on a daily basis in step 524. As each of the five daily statement files becomes available, a core main file may be created in step 526 by compiling the offer data and statement data. The core main files may be independently created and passed on to a rule processing step 528, also known as a decision account process (DAP). In this step, the offer rules may be executed to qualify each account for available offers, generating account-level tags that represent offers for which the account qualifies. These account-level tags are also known as insert qualification (IQ) tags. After the rule processing step 528, the core main files may be passed on for further processing in step 530 which may include tagging process and output file creation, as will be described in detail below.

Referring again to FIG. 1, in step 112, a weight management algorithm may be run to ensure each account's statement is within a weight limit. To mitigate excess postage caused by overweight mail pieces, not all offers that an account qualifies for will be inserted into its statement. The weight management algorithm may impose further limitations on the number of offers each account may receive. The weight of the outer envelope, inner envelope, statement pages, inserts, convenience checks and any other offer pieces may be summed up to determine the total statement weight for each account. According to one embodiment of the invention, total weight of a statement may be kept below one ounce. If, however, the qualified offers for the account will push the total weight over the one-ounce limit, one or more optional offers or those with lower priorities may be excluded. If an offer that pushes the statement over the weight limit is mandatory (i.e., the offer has to be included due to certain contractual obligation to a business partner), a postage will have to be paid for an extra ounce. In that case, additional offers may be included to fill the statement weight up to two ounces. Other weight thresholds may also be imposed based on pricing structure of postages.

In step 114, offer targeting output files may be created. The IQ tags that have been generated in step 110 and modified in step 112 may now be merged with their respective account data to create account-specific tag files. Then the tag files may be further merged with original statement files to generate output files. The original statement files typically include, among other things, offer placeholders at predetermined locations within the files. These placeholders may now be replaced with the IQ tags that represent qualified offers. The output files may now include all the information regarding association of offers with individual accounts and the placement of offers within each statement.

Figure 6:
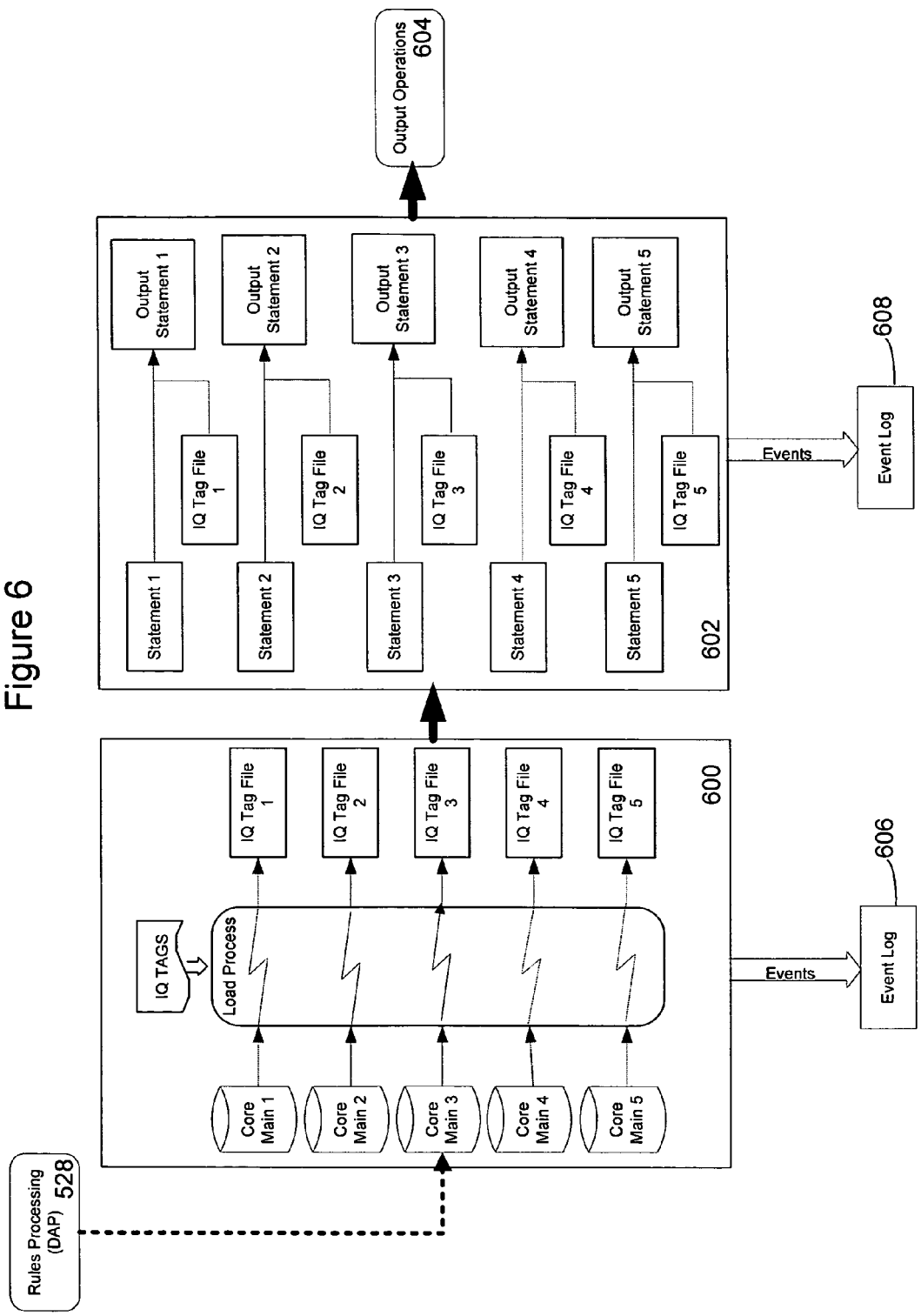
FIG. 6 is a block diagram illustrating an exemplary process for tagging and creating output files according to an embodiment of the present invention.

An exemplary embodiment of the tagging process and output file creation is illustrated in FIG. 6. The tagging step 600 and the output file creation step 602 may be two of the downstream steps following the rule processing step 528 shown in FIG. 5. In step 600, the IQ tags may be merged with corresponding accounts in the five core main files. The resulting IQ tag files are unique to the account reference numbers (ARNs). These IQ tag files may be further merged with their respective statement files in step 602 to generate the offer targeting output files which are sent to output operations 604 for composition and production of the actual statements. Events associated with the processing steps 600 and 602 may be recorded in the event logs 606 and 608.

Referring again to FIG. 1, in step 116, the actual statements may be composed using the appropriate contents, account data and offer targeting output files, etc. In this step, all data may be integrated to generate the final version of the statements and offers.

In step 118, inventory management routines may be run to ensure proper supply of materials for production and insertion of the offers. An automated inventory system may be used to track and report inventory usage and availability.

In step 120, a results file may be generated. The results file may be a log that reflects, for each account, the number of qualified offers and the actual number of offers inserted in the statement both before and after weight management (step 112). The difference between these two numbers due to weight management is also accounted for in the results file. The results file may be reconciled with the offer rule file(s) and the offer targeting output files to provide feedback information of the offer management cycle. Such feedback information may be a basis for adjusting offer rankings and offer rules in future cycles.

In step 122, a suite of simulation tools may be run to facilitate integration and enhancement of the offer management functions as described above. These simulation tools may be run prior to a statement cycle, or concurrently with various offer management steps during a statement cycle, or at the end of a statement cycle. The simulations may be based on offer rules, offer targeting output files, inventory weights, weight management algorithm, results file, and inventory management.

For example, a manufacturing control simulation may be provided to better explain the link between offer targeting and inventory management. The simulation tool may receive the weight data of every insert, envelope, and paper stock from the inventory management system. The manufacturing control simulation may account for inventory weights, consider the average number of statement pages, replicate the weight management logic and set-up optimization routines, and predict "Qualification" and "Actuals" insertion figures for every offer ID.

Figure 7:
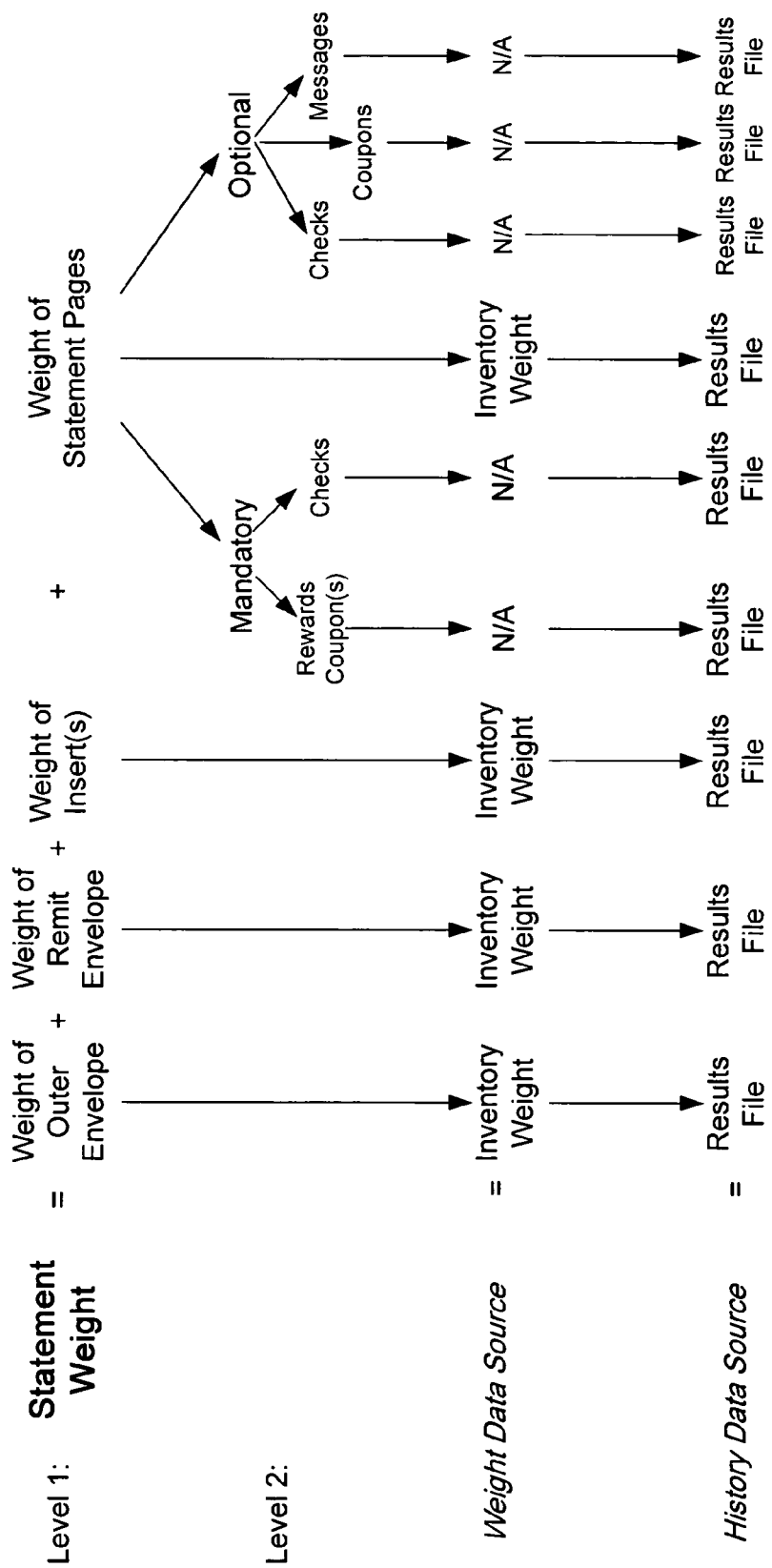
FIG. 7 illustrates an exemplary breakdown of statement sub-components in accordance with an embodiment of the present invention.

According to one embodiment, a page weight simulation function may be provided, where the average number of pages per statement may be used to derive simulation results and account for the impact of statement sub-components (e.g., checks and coupons). FIG. 7 illustrates an exemplary breakdown of statement sub-components in accordance with an embodiment of the present invention. The weight of a statement is typically the combined weight of its outer envelope, remittance envelope, offer inserts, and the statement pages. The statement pages may further comprise, without limitation: reward coupon(s), single, double, or multiple checks, marketing coupons, marketing messages, and one or more transaction pages based on the number of activities for that month. Apart from the individual weight of the above-mentioned statement sub-components, the layout and graphics of these sub-components can also have an effect on the statement weight. The page simulation function may simulate and forecast the impact of the layout, graphics, prioritization and weight of the statement sub-components on the weight of a final statement based on inventory weight of the statement sub-components and historic offer data in the results file. For example, a new branding campaign by a co-branding business partner may want a new logo on each transaction page with special coupons. The new logo may increase the number of transaction pages, which may cause certain offers to be dropped due to weight restrictions. The page weight simulator may provide the ability to test possible statement compositions and predict potential weight problems in combination with the above-described offer management process.

Other simulation functionalities may include, for example, the ability to run a single account through the simulator, and the ability to attach a file of accounts to run through the simulator. A system administrator or a super user may also create a virtual account, assign decision element values to the virtual account, and run it through simulation. Furthermore, a user may test run an entire cycle or an entire month of offers through simulation. Alternatively, the simulator may be run against previous months' historic data as well as current month's real-time account data. Further simulation may be provided to predict workflows and volumes amongst multiple statement production facilities. Once a super user reviews and approves the simulation results, they may be seamlessly exported to production facilities.

Figure 2:
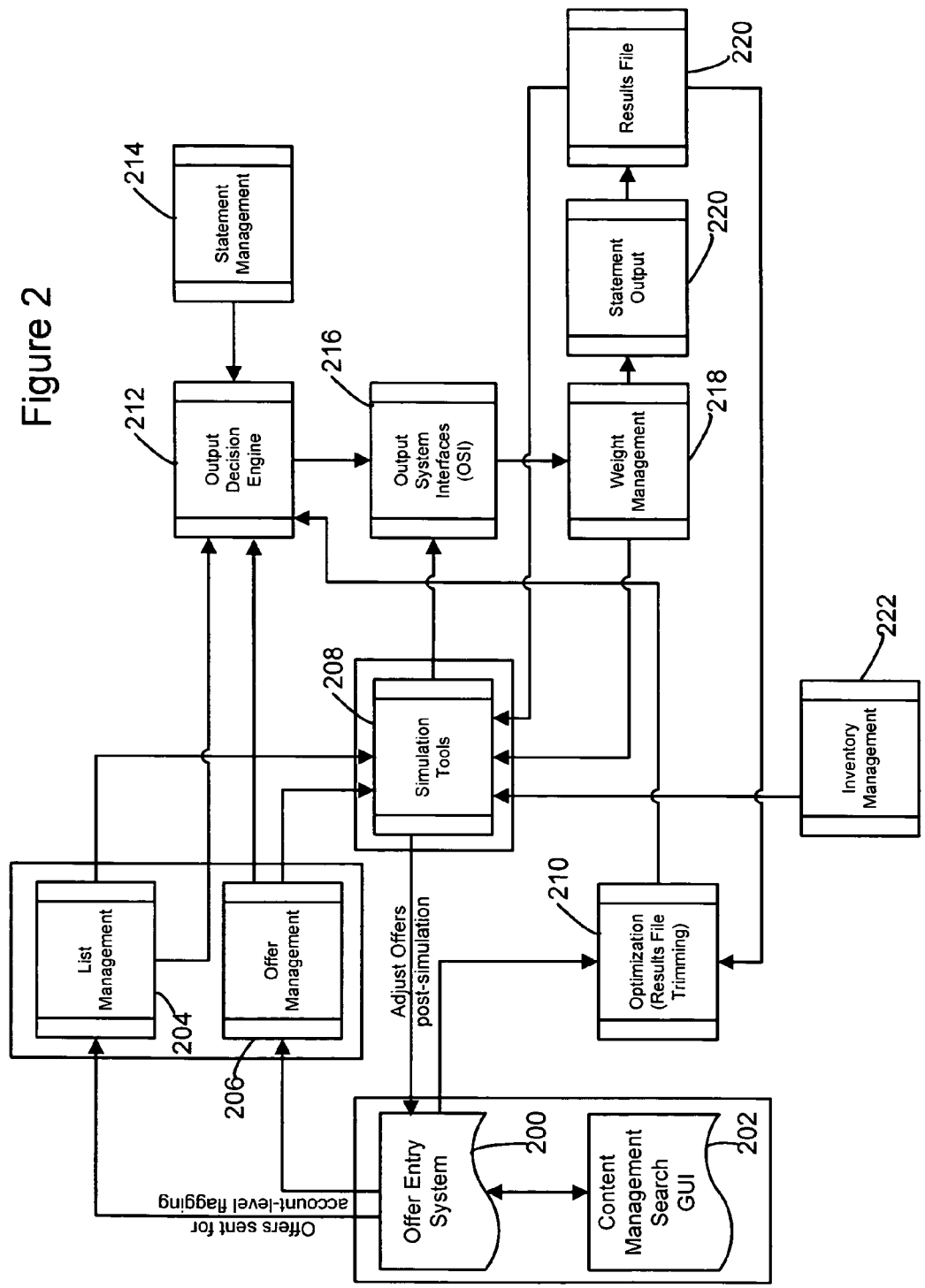
FIG. 2 is a block diagram illustrating exemplary data flows and functional modules according to an embodiment of the present invention.

Referring to FIG. 2, there is shown a block diagram illustrating exemplary data flows and functional modules according to an embodiment of the present invention. Account managers may enter offers through the Offer Entry System (OES) 200. A content management search GUI may be provided for the OES 200 so that appropriate contents may be searched, retrieved and previewed in the creation of offer messages. General offers may be sent to list management module 204 for account-level flagging and partner offers may be sent to offer management module 206 for flagging. Offers and related business rules entered through the OES 200 may be forwarded to an optimization module 210, where the offers are assigned to appropriate customer populations based on optimization algorithms such as offer counter based re-prioritization. An output decision engine (ODE) module 212 may import the offer rules from the optimization module 210, and pull offer data from list management module 204 and offer management module 206. The ODE 212 may apply the offer rules to statement data pulled from statement management module 214 and send the resulting output files to output system interfaces (OSI) 216. Weight management module 218 may impose weight limits on the statements and adjust the final set of offers for each statement. Statement output module 220 may compose and produce the final statements with offers included. Results file module 220 may track the number of qualified offers and the number of actual offer insertion for each account. These numbers may be provided to the optimization module 210 to facilitate results file trimming decisions whereby the offers that have hit requested volumes are discontinued for the remaining statement month. Inventory management module 222 may monitor the inventory level of materials for production of statements and offers. All these function modules may be directly or indirectly linked to the simulation tools module 208. The simulation tools module 208 may pull data from list management module 204, offer management module 206, inventory management module 222, weight management module 218 and results file module 220. The simulation tools module 208 may simulate offer targeting on statement page level, account level, group level, cycle level or statement month level. The simulation results may help identify issues in the end-to-end offer management process and provide a basis for adjusting the offers and business rules. The simulation tools module 208 may also provide manufacturing controls through simulations. It may use historic data, inventory data and requested production volumes to eliminate excessive inventory, predict or reduce stock-outs, and efficiently manage production setups.

Figure 3:
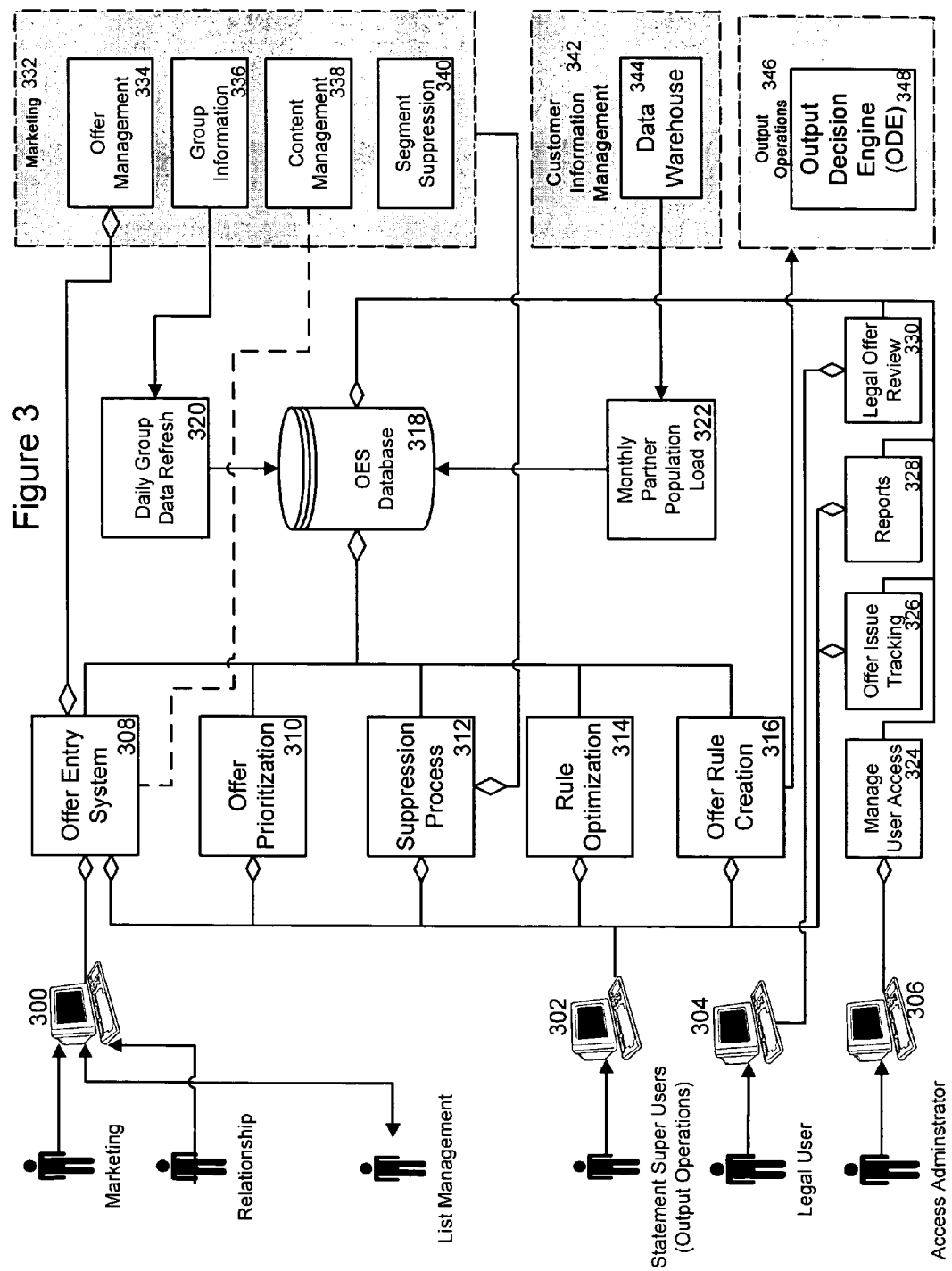
FIG. 3 is a block diagram illustrating exemplary data flows and functional modules according to another embodiment of the present invention.

Referring now to FIG. 3, there is shown a block diagram illustrating exemplary data flows and functional modules according to another embodiment of the present invention. Offer Entry System 308 is provided with a user interface 300 through which Marketing and Relationship personnel may enter or modify offers and their related rules. A data exchange may be provided between the Offer Entry System 308 and an Offer Management module 334 in the Marketing Division 332. Another data link may be established for the Offer Entry System 308 to search and retrieve contents from a Content Management module 338 in the Marketing Division 332. Through the user interface 300, List Management personnel may also retrieve the offers and create flags or placeholders for individual accounts. A similar interface 302 may be provided for statement super users (usually Output Operations personnel) to access the Offer Entry System 308 and the related function modules (310-316). Legal users may use a user interface 304 to access Legal Offer Review module 330 to review the offers for legal compliance. A user interface 306 and a Manage User Access module 324 are provided for access administrators to control access to the system. An Offer Prioritization module 310 may rank the offer items. A Suppression Process module 312 may identify and group qualified accounts or groups for each offer based on information imported from Segment Suppression module 340. A Rule Optimization module 314 may enhance the offer rules to level-load offer targeting. And an Offer Rule Creation module 316 may build the offer rule file and send it to an Output Decision Engine (ODE) module 348 in the Output Operations Division 346. An Offer Issue Tracking module 326 may monitor the functional modules 308-316 for offer issues during the operations. A Reports module 328 may generate reports regarding the processing of offers and rules. An OES Database 318 may serve as a data repository for the above-mentioned functional modules. Module 320, receiving data feed from a Group Information module 336, may perform daily portfolio/partner data refresh and send the updated data to the OES Database 318. Module 322, receiving customer population data from a Data Warehouse 344, may perform monthly partner population load to the OES Database 318.

It should be appreciated that the system and method for offer management in accordance with the present invention is not limited to printed communications such as letters and statements. The offer management process may be useful in preparing electronic communications and web-based presentations as well. For example, a banking customer may receive electronic statements via E-mail or view the statements at an Internet website. For the E-mail channel, there may be file-size limitations analogous to postage weight limits encountered in the preparation of physical statements. For a web-based presentation, there may be limitations as to how many offer banners can fit within a viewer window. In these or other circumstances where there is limited communication capacity, it may be desirable to constrain the number of offers included for each account based on the offer management processes described above.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

What is claimed is:

1. A method for offer management, the method comprising:
   providing a plurality of offers and a plurality of business rules, wherein each of the plurality of offers is to be targeted at a predetermined number of accounts selected from a plurality of accounts based on the plurality of business rules;
   prioritizing the plurality of offers;
   grouping the plurality of accounts based on their qualification for each of the plurality of offers in accordance with the plurality of business rules;
   optimizing the plurality of business rules based at least in part on the prioritization of the plurality of offers and the grouping of the plurality of accounts, such that each of the plurality of offers is associated with at least the predetermined number of accounts;
   imposing a volume limit or weight limit for offers assigned to each of the plurality of accounts;
   incorporating the plurality of offers into communications associated with the plurality of accounts based at least in part on the plurality of optimized business rules and the volume limit or weight limit; and
   managing production of the communications based on at least one simulation, wherein the at least one simulation is performed based on data associated with the plurality of offers, the plurality of business rules and the plurality of accounts.

2. The method according to claim 1 further comprising adding, modifying, deleting or copying one or more offers and related business rules through a user interface.

3. The method according to claim 1, wherein at least part of the plurality of offers are associated with one or more financial products.

4. The method according to claim 1, wherein at least part of the plurality of offers are associated with one or more insurance products.

5. The method according to claim 1, wherein at least part of the plurality of offers and the plurality of business rules are associated with one or more individual accounts.

6. The method according to claim 1, wherein at least part of the plurality of offers and the plurality of business rules are associated with one or more groups, each group comprising one or more individual accounts.

7. The method according to claim 1 further comprising incorporating, from a content management database, a plurality of contents associated with the plurality of offers.

8. The method according to claim 1, wherein the prioritization of the plurality of offers is based at least in part on an effectiveness of one or more historic offers.

9. The method according to claim 8, wherein the effectiveness is measured based on a fractional change or a logarithmic change in one or more financial behaviors of the plurality of accounts.

10. The method according to claim 1, wherein the prioritization of the plurality of offers is based at least in part on types or categories of the plurality of offers.

11. The method according to claim 1 further comprising adjusting the prioritization of the plurality of offers.

12. The method according to claim 1 further comprising building a rule file based on the plurality of offers and the plurality of optimized business rules.

13. The method according to claim 12, wherein the rule file is based on a business action language (BAL).

14. The method according to claim 1 further comprising generating tags representative of the plurality of offers and merging the tags with the communications based at least in part on the plurality of optimized business rules.

15. The method according to claim 1 further comprising comparing a first number of offers that are qualified for an account with a second number of offers that are incorporated into a communication associated with the account.

16. The method according to claim 1, wherein the step of managing production further comprises maintaining an accurate inventory of materials associated with the production of the communications based on the at least one simulation.

17. A method for offer management, the method comprising:
   providing a plurality of offers for incorporation into statement letters associated with a plurality of accounts, wherein the incorporation of the plurality of offers is based on a plurality of business rules; and
   simulating a final composition of the statement letters based at least in part on
      a prioritization of the plurality of offers,
      associations of the plurality of offers with the plurality of accounts, wherein the associations are made by optimizing the plurality of business rules based at least in part on the prioritization of the plurality of offers and the grouping of the plurality of accounts, such that each of the plurality of offers is associated with at least the predetermined number of accounts, and
      layout, graphics and inventory weight associated with one or more sub-components of the statement letters.

18. The method according to claim 17 further comprising managing an inventory of materials associated with preparation of the statement letters based on the simulated final composition.

19. A system for offer management, the system comprising:
   at least one user interface for entering and modifying a plurality of offers and a plurality of business rules, wherein each of the plurality of offers is to be targeted at a predetermined number of accounts selected from a plurality of accounts based on the plurality of business rules;
   storage means for storing and managing the plurality of offers, the plurality of business rules and the plurality of accounts; and
   processor means for
      prioritizing the plurality of offers;
      grouping the plurality of accounts based on their qualification for each of the plurality of offers in accordance with the plurality of business rules;
      optimizing the plurality of business rules based at least in part on the prioritization of the plurality of offers and the grouping of the plurality of accounts, such that each of the plurality of offers is associated with at least the predetermined number of accounts;
      imposing a volume limit or weight limit for offers assigned to each of the plurality of accounts;
      incorporating the plurality of offers into communications associated with the plurality of accounts based at least in part on the plurality of optimized business rules and the volume limit or weight limit; and
      managing production of the communications based on at least one simulation, wherein the at least one simulation is performed based on data associated with the plurality of offers, the plurality of business rules and the plurality of accounts.

20. The system according to claim 19 further comprising means for incorporating, from a content management database, a plurality of contents associated with the plurality of offers.

21. The system according to claim 19, wherein the prioritization of the plurality of offers is based at least in part on an effectiveness of one or more historic offers.

22. The system according to claim 21, wherein the effectiveness is measured based on a fractional change or a logarithmic change in one or more financial behaviors of the plurality of accounts.

23. The system according to claim 19, wherein the prioritization of the plurality of offers is based at least in part on types or categories of the plurality of offers.

24. The system according to claim 19 further comprising means for adjusting the prioritization of the plurality of offers.

25. The system according to claim 19 further comprising means for building a rule file based on the plurality of offers and the plurality of optimized business rules.

26. The system according to claim 25, wherein the rule file is based on a business action language (BAL).

27. The system according to claim 19 further comprising means for generating tags representative of the plurality of offers and merging the tags with the communications based at least in part on the plurality of optimized business rules.

28. The system according to claim 19 further comprising means for comparing a first number of offers that are qualified for an account with a second number of offers that are incorporated into a communication associated with the account.

29. The system according to claim 19 further comprising means for maintaining an accurate inventory of materials associated with the production of the communications based on the at least one simulation.

30. A computer readable medium having code for causing at least one processor to perform offer management, the computer readable medium comprising:
  code to provide a plurality of offers and a plurality of business rules, wherein each of the plurality of offers is to be targeted at a predetermined number of accounts selected from a plurality of accounts based on the plurality of business rules;
  code to prioritize the plurality of offers;
  code to group the plurality of accounts based on their qualification for each of the plurality of offers in accordance with the plurality of business rules;
  code to optimize the plurality of business rules based at least in part on the prioritization of the plurality of offers and the grouping of the plurality of accounts, such that each of the plurality of offers is associated with at least the predetermined number of accounts;
  code to impose a volume limit or weight limit for offers assigned to each of the plurality of accounts;
  code to incorporate the plurality of offers into communications associated with the plurality of accounts based at least in part on the plurality of optimized business rules and the volume limit or weight limit; and
  code to manage production of the communications based on at least one simulation, wherein the at least one simulation is performed based on data associated with the plurality of offers, the plurality of business rules and the plurality of accounts.

* * * * *